(12) United States Patent
Donovan et al.

(10) Patent No.: US 10,099,325 B2
(45) Date of Patent: Oct. 16, 2018

(54) METHOD FOR MANUFACTURING A HYBRID HEAT EXCHANGER

(71) Applicant: Delavan Inc, West Des Moines, IA (US)

(72) Inventors: Matthew Donovan, Ankeny, IA (US); Sergey Mironets, Charlotte, NC (US)

(73) Assignee: Delavan Inc., West Des Moines, IA (US)

( * ) Notice: Subject to any disclaimer, the term of this patent is extended or adjusted under 35 U.S.C. 154(b) by 591 days.

(21) Appl. No.: 14/686,859

(22) Filed: Apr. 15, 2015

(65) Prior Publication Data
US 2016/0305718 A1    Oct. 20, 2016

(51) Int. Cl.
| | | |
|---|---|---|
| *B23P 15/26* | (2006.01) | |
| *B22F 5/10* | (2006.01) | |
| *F28F 3/00* | (2006.01) | |
| *F28F 3/02* | (2006.01) | |
| *F28F 21/08* | (2006.01) | |
| *F28D 9/00* | (2006.01) | |
| *B22F 3/105* | (2006.01) | |
| *B33Y 10/00* | (2015.01) | |

(Continued)

(52) U.S. Cl.
CPC ............ *B23P 15/26* (2013.01); *B22F 3/1055* (2013.01); *B22F 5/10* (2013.01); *B33Y 10/00* (2014.12); *F28D 9/0031* (2013.01); *F28F 3/00* (2013.01); *F28F 3/025* (2013.01); *F28F 21/08* (2013.01); *B22F 7/08* (2013.01); *B22F 2005/005* (2013.01); *Y02P 10/295* (2015.11); *Y10T 29/49389* (2015.01)

(58) Field of Classification Search
CPC .......... B23P 15/26; B22F 3/1055; B22F 5/10; B22F 7/08; B22F 2005/005; B33Y 10/00; B21D 53/02; B21D 53/08; F28F 3/00; F28F 21/08; F28F 3/025; F28D 9/0031; Y10T 29/4935; Y10T 29/49389; Y10T 29/53983

See application file for complete search history.

(56) References Cited

U.S. PATENT DOCUMENTS

| | | | | |
|---|---|---|---|---|
| 3,713,862 A | * | 1/1973 | Winkless | ............... B05C 19/02 118/301 |
| 3,815,535 A | * | 6/1974 | Becker | ................... B21D 51/26 427/181 |

(Continued)

FOREIGN PATENT DOCUMENTS

| | | |
|---|---|---|
| JP | 2014098527 A | 5/2014 |
| WO | WO-2009105454 A2 | 8/2009 |
| WO | WO-2014111707 A1 | 7/2014 |

OTHER PUBLICATIONS

United Kingdom Intellectual Property Office Search Report dated Aug. 1, 2016, issued in corresponding GB Application No. 1606535.1.

*Primary Examiner* — Sarang Afzali
(74) *Attorney, Agent, or Firm* — Locke Lord LLP; Daniel J. Fiorello; Scott D. Wofsy

(57) ABSTRACT

A method for manufacturing a heat exchanger structure includes additively forming a top layer of a header after disposing a corrugated core within the header to retain the corrugated core within the header. Additively forming the top layer can include filling the corrugated core with powder until a suitable layer of powder overlays the corrugated core and the header and sintering the powder to form the top layer of the header.

11 Claims, 3 Drawing Sheets

(51) Int. Cl.
  *B22F 7/08* (2006.01)
  *B22F 5/00* (2006.01)

(56) References Cited

U.S. PATENT DOCUMENTS

| | | | | |
|---|---|---|---|---|
| 5,701,669 | A * | 12/1997 | Meier | B23P 6/007 |
| | | | | 29/281.6 |
| 7,810,552 | B2 * | 10/2010 | Slaughter | B22F 3/1055 |
| | | | | 165/148 |
| 7,866,372 | B2 | 1/2011 | Slaughter | |
| 8,869,398 | B2 * | 10/2014 | Kent | B21D 53/04 |
| | | | | 29/890.03 |
| 2008/0201008 | A1 | 8/2008 | Twelves et al. | |
| 2009/0250196 | A1 | 10/2009 | Batty et al. | |
| 2013/0308273 | A1 | 11/2013 | Gard et al. | |
| 2014/0284038 | A1 | 9/2014 | Vedula et al. | |
| 2015/0137412 | A1 | 5/2015 | Schalansky | |
| 2016/0108814 | A1 * | 4/2016 | Schmitz | F02C 7/10 |
| | | | | 60/39.511 |
| 2016/0230595 | A1 * | 8/2016 | Wong | F28F 3/02 |
| 2016/0231068 | A1 * | 8/2016 | Schmitz | F28F 9/02 |

* cited by examiner

METHOD FOR MANUFACTURING A HYBRID HEAT EXCHANGER

BACKGROUND

1. Field

The present disclosure relates to heat exchangers, more specifically to fin-type heat exchangers and methods of making such heat exchangers.

2. Description of Related Art

The weak links in application of the current Laser Powder Bed Fusion (LPBF) technology to producing fin-type core heat exchangers is the limitation of achieving thin wall thickness and powder removal between tightly spaced fins. The wall thickness is primarily limited by dynamics of melting pool formation. The laser beam interaction with powder bed is controlled by laser energy density, which depends on beam diameter, laser power, scanning velocity, and powder characteristics. Experimental studies show limited success in achieving wall thickness less than 0.012 inches. However, certain applications can require wall thicknesses of 0.004 inches. Traditional methods to achieve such wall thickness with additive manufacturing resulted in microstructures with substantial voids and porosity. However, other traditional non-additive manufacturing methods utilize joining processes such as welding and brazing, which have limitations in terms of heat exchanger design space and process variation.

Such conventional methods and systems have generally been considered satisfactory for their intended purpose. However, there is still a need in the art for improved heat exchanger structures and methods of making heat exchangers. The present disclosure provides a solution for this need.

SUMMARY

A method for manufacturing a heat exchanger structure includes additively forming a top layer of a header after disposing a corrugated core within the header to retain the corrugated core within the header. Additively forming the top layer can include filling the corrugated core with powder until a suitable layer of powder overlays the corrugated core and the header and sintering the powder to form the top layer of the header.

The method can further include additively forming a second header from the top layer. The method can further include disposing a second corrugated core within the second header. The method can further include additively forming a second top layer for the second header after disposing the second corrugated core within the second header to retain the corrugated core within the header.

Additively forming the second top layer can include filling the second corrugated core with powder until a suitable layer of powder overlays the second corrugated core and the second header and sintering the powder to form the second top layer of the second header.

The method can further include removing remaining powder from the corrugated core. Removing remaining powder from the corrugated core can include at least one of flushing, shaking, vacuuming, pressurizing, and/or a combination thereof.

The method can further include placing the header on a build platform and placing a build plate around the header to retain the header and/or to maintain header shape during manufacturing. The method can further include placing a build plate around the second header to retain the second header and/or to maintain header shape during manufacturing.

A heat exchanger structure can include an additively manufactured header defining a plurality of fluid channels therein and an opening, and a corrugated core defining flow channels therethrough and having a wall thickness of about less than or equal to 0.004 inches (about 0.1 mm), wherein the flow channels are disposed in fluid communication with the plurality of fluid channels. The corrugated core can be non-additively manufactured.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
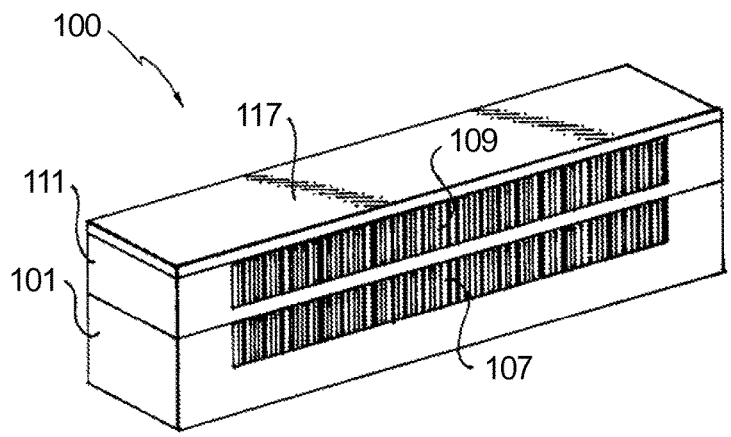
FIG. 1 is a cross-sectional, perspective view of an embodiment of a heat exchanger structure in accordance with this disclosure.

Reference will now be made to the drawings wherein like reference numerals identify similar structural features or aspects of the subject disclosure. For purposes of explanation and illustration, and not limitation, an illustrative view of an embodiment of a heat exchanger structure in accordance with the disclosure is shown in FIG. 1 and is designated generally by reference character 100. Other embodiments and/or aspects of this disclosure are shown in FIGS. 2-7. The systems and methods described herein can be used to manufacture heat exchanger structures that include hybrid features.

Figure 2:
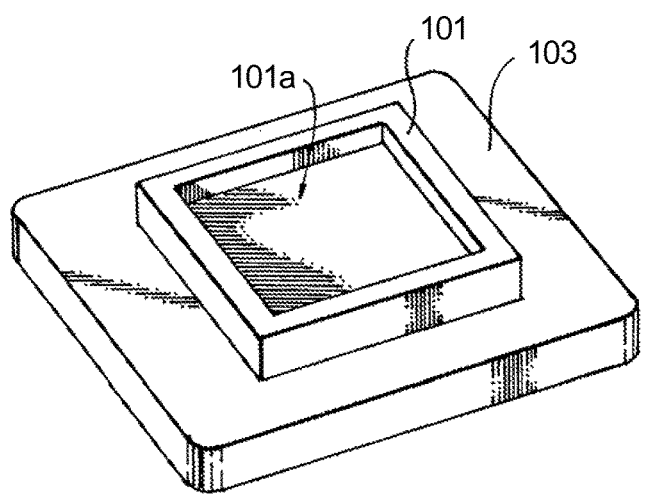
FIG. 2 is a perspective view of an embodiment of a header disposed on a build platform.
Figure 3:
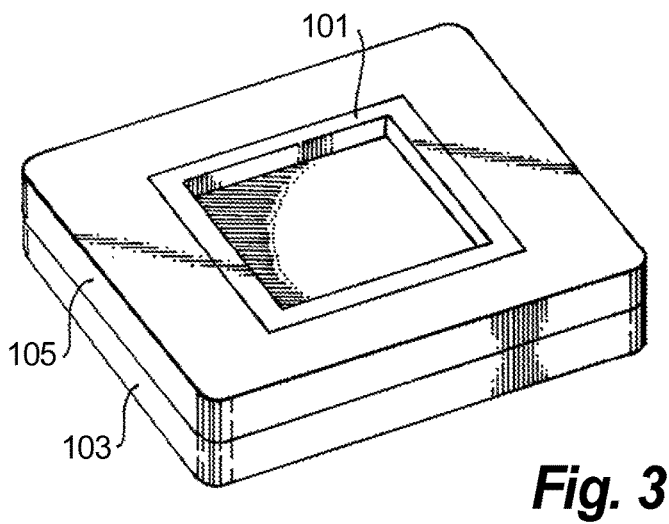
FIG. 3 is a perspective view of the embodiment of a header as shown in FIG. 2, showing a build plate disposed therearound.

Referring to FIGS. 1 and 2, a method for manufacturing a heat exchanger structure 100 can include placing a header 101 on a build platform 103. The header 101 can define a plurality of suitable fluid channels (not shown) therein and an opening 101a. Referring to FIG. 3, in certain embodiments, a build plate 105 can be placed around the header 101 to retain the header 101 and/or to maintain header shape during manufacturing.

Figure 4A:
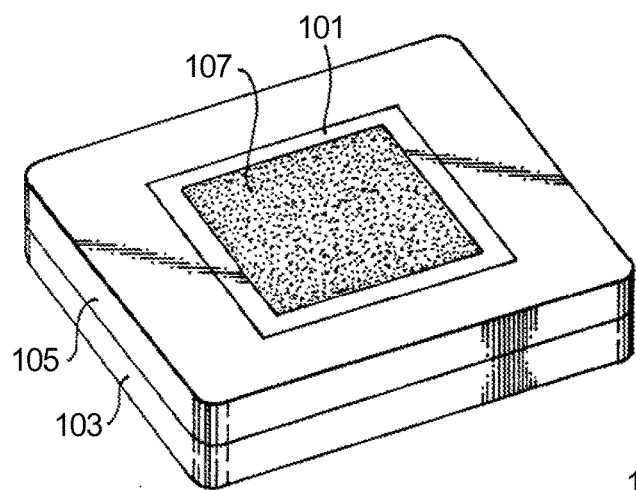
FIG. 4A is a perspective view of the embodiment of the header as shown in FIG. 2, showing a corrugated core disposed therein.
Figure 4B:
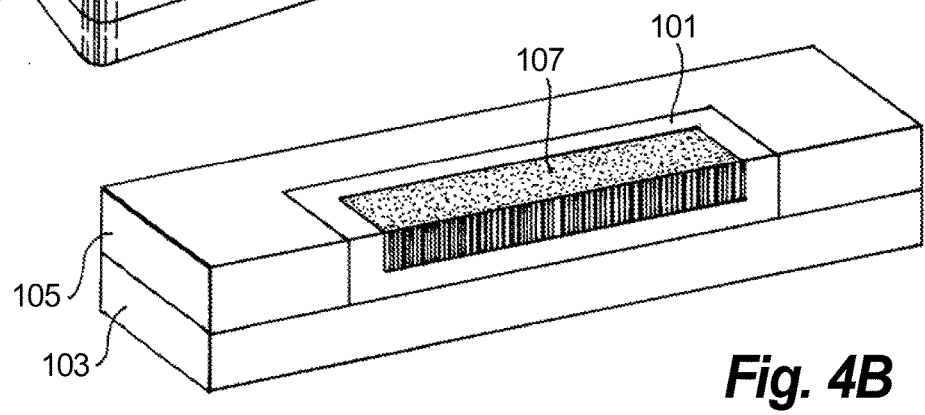
FIG. 4B is a cross-sectional, perspective view of the embodiment of FIG. 4A.

Referring to FIGS. 4A and 4B, a corrugated core 107 can be disposed within the header 101. The corrugated core 107 defines flow channels therethrough with a plurality of walls that define corrugations or any other suitable flow channels. The corrugated core 107 can include any suitable wall thickness (e.g., about less than or equal to 0.004 inches (about 0.1 mm)). In certain embodiments, the corrugated core 107 can be non-additively manufactured, which can allow for wall thicknesses below that which is achievable by traditional additive manufacturing processes. The flow channels of the corrugated core 107 are disposed in fluid communication with the plurality of fluid channels of the header 101.

Figure 5:
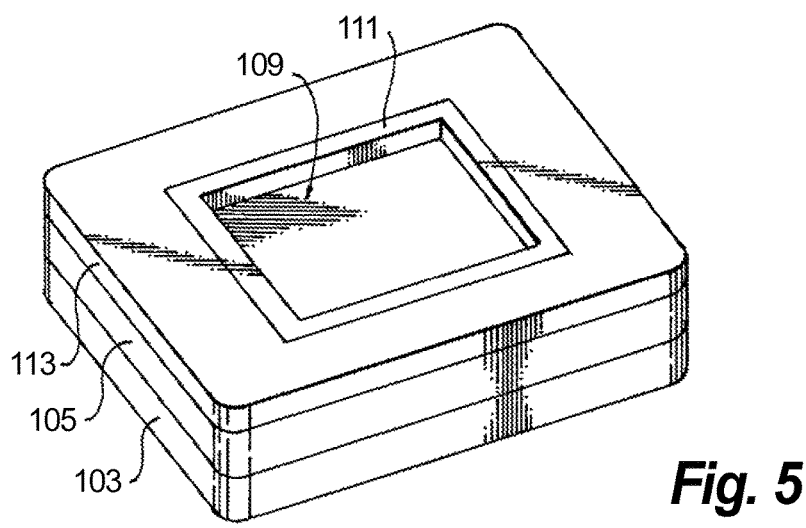
FIG. 5 is a perspective view showing an embodiment of a top layer forming a second header disposed over the corrugated core of FIG. 4A.
Figure 6:
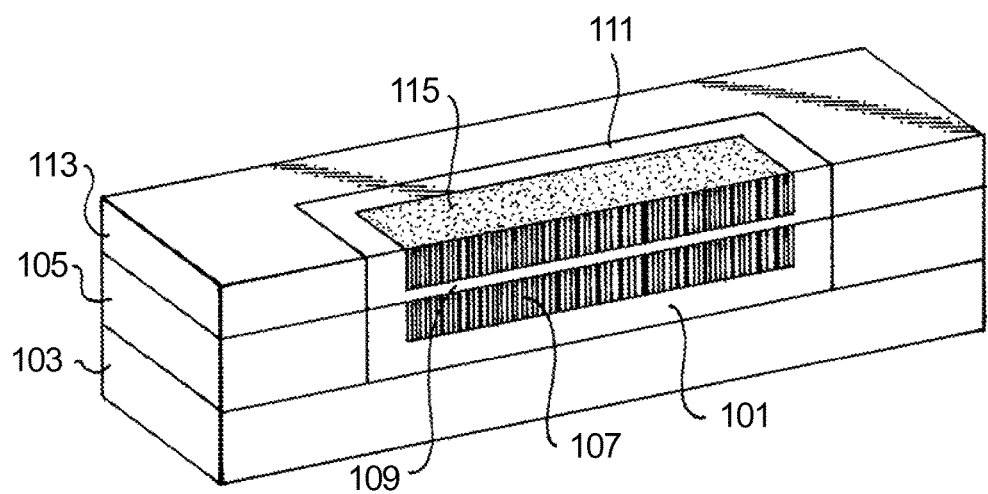
FIG. 6 is a cross-sectional, perspective view showing a second corrugated core disposed within the second header of FIG. 5.

Referring to FIGS. 5 and 6, a top layer 109 can be additively manufactured or otherwise manufactured on the header 101 after disposing a corrugated core 107 within the header 101 to retain the corrugated core 107 within the header 107. Additively forming the top layer 109 can include filling the corrugated core 107 with a suitable powder (e.g., metal powder) until a suitable layer of powder overlays the corrugated core 107 and the header 101. Additively forming the top layer 109 can also include sintering the powder to form the top layer 109 of the header 101.

The method can further include additively forming a second header 111 from the top layer 109. In certain embodiments, the method can further include disposing a second corrugated core 115 within the second header 111. The method can further include placing a build plate 113 around the second header 111 to retain the second header 111 and/or to maintain header shape during manufacturing.

Figure 7:
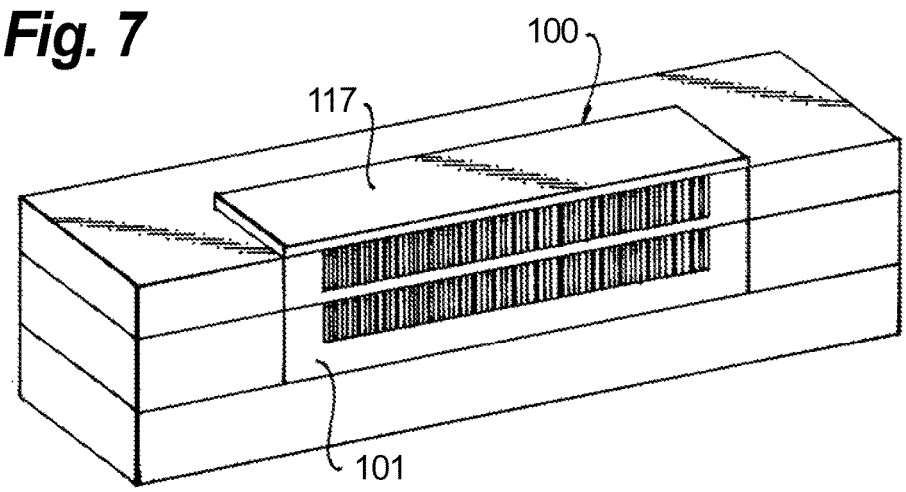
FIG. 7 is a cross-sectional, perspective view showing a top layer disposed over the second corrugated core of FIG. 6.

Referring to FIG. 7, the method can further include additively forming a second top layer 117 for the second header 111 after disposing the second corrugated core 115 within the second header 111 to retain the corrugated core 115 within the second header 111. Similar to top layer 109, the second top layer 117 can be additively formed by filling the second corrugated core 115 with a suitable powder until a suitable layer of powder overlays the second corrugated core 115 and the second header 111, followed by sintering the powder to form the second top layer 117 of the second header 111.

The method can further include removing remaining powder from the first and/or second corrugated cores 107, 115 at any suitable portion of the method. Removing remaining powder from the corrugated cores 107, 115 can include at least one of flushing, shaking, vacuuming, pressurizing, and/or a combination thereof. Any other suitable method to remove remaining powder is contemplated herein.

While the method as described above is shown as forming a structure 100 including two layers, it is contemplated that any suitable number and/or type of headers with any suitable number and/or type of corrugated cores can be made herein using any suitable method that includes embodiments (or any suitable portion thereof) of a method as described hereinabove. For example, a single layer heat exchanger structure is contemplated herein. In other embodiments, a plurality of layers (e.g., two, three, four, etc.) can be made including one or more layers manufactured using methods or portions thereof as described herein above.

Using a method as described above, referring to FIG. 1, a heat exchanger structure 100 can be made to include an additively manufactured header 101 and a corrugated core 107 defining flow channels therethrough and having a wall thickness of about less than or equal to 0.004 inches (about 0.1 mm). The corrugated core 117 can be non-additively manufactured, thereby creating a hybrid heat exchanger structure 100. The flow channels are disposed in fluid communication with the plurality of fluid channels. As described above, while the heat exchanger structure 100 is shown as having two layers, the heat exchanger structure 100 can include any suitable number of layers.

The methods and systems of the present disclosure, as described above and shown in the drawings, provide for hybrid heat exchanger structures with superior properties including the advantages of additive manufacturing (e.g., complex header channels and shapes) and the advantages of traditional manufacturing procedures (e.g., thinner corrugated core walls for higher efficiency). While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for manufacturing a heat exchanger structure, comprising:
    disposing a first corrugated core within a first header enclosure; and
    additively forming a first top layer of the first header enclosure after disposing the first corrugated core within the first header enclosure to retain the first corrugated core within the first header enclosure, wherein additively forming the first top layer includes:
        filling the first corrugated core with powder until a suitable layer of powder overlays an outer surface the first corrugated core and the first header enclosure; and
        sintering the powder to form the first top layer of the first header enclosure to form at least a portion of the heat exchanger structure.

2. The method of claim 1, further comprising additively forming a second header enclosure from the first top layer.

3. The method of claim 2, further comprising disposing a second corrugated core within the second header enclosure.

4. The method of claim 3, further comprising additively forming a second top layer for the second header enclosure after disposing the second corrugated core within the second header enclosure to retain the second corrugated core within the second header enclosure.

5. The method of claim 4, wherein additively forming the second top layer includes:
    filling the second corrugated core with powder until a suitable layer of powder overlays an outer surface of the second corrugated core and the second header enclosure; and
    sintering the powder to form the second top layer of the second header enclosure.

6. The method of claim 5, further comprising removing remaining powder from the second corrugated core.

7. The method of claim 6, wherein the removing remaining powder from the second corrugated core includes at least one of flushing, shaking, vacuuming, pressurizing, and/or a combination thereof.

8. The method of claim 2, further comprising placing a build plate around the second header enclosure to retain the second header enclosure and/or to maintain second header enclosure shape during additively forming.

9. The method of claim 1, further comprising removing remaining powder from the first corrugated core.

10. The method of claim 9, wherein the removing remaining powder from the first corrugated core includes at least one of flushing, shaking, vacuuming, pressurizing, and/or a combination thereof.

11. The method of claim 1, further comprising placing the first header enclosure on a build platform and placing a build plate around the first header enclosure to retain the first header enclosure and/or to maintain header enclosure shape during additively forming.

* * * * *